(12) United States Patent
Wang et al.

(10) Patent No.: US 9,880,023 B2
(45) Date of Patent: *Jan. 30, 2018

(54) DIRECT READ METERING DEVICE AND DIRECT READ WATER METER

(71) Applicant: Multidimension Technology Co., Ltd., Zhangjiagang (CN)

(72) Inventors: Feng Wang, Zhangjiagang (CN); Junyun Wang, Zhangjiagang (CN); Xiaofeng Cheng, Zhangjiagang (CN)

(73) Assignee: Multidimension Technology Co., Ltd., Zhangjiagang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/421,941

(22) PCT Filed: Aug. 26, 2013

(86) PCT No.: PCT/CN2013/082261
§ 371 (c)(1),
(2) Date: Feb. 16, 2015

(87) PCT Pub. No.: WO2014/029369
PCT Pub. Date: Feb. 27, 2014

(65) Prior Publication Data
US 2015/0204692 A1 Jul. 23, 2015

(30) Foreign Application Priority Data
Aug. 24, 2012 (CN) ............. 2012 2 0424579 U

(51) Int. Cl.
*G01F 1/075* (2006.01)
*G01D 5/14* (2006.01)
(Continued)

(52) U.S. Cl.
CPC ............ *G01D 5/14* (2013.01); *G01B 7/30* (2013.01); *G01D 4/008* (2013.01); *G01D 5/145* (2013.01);
(Continued)

(58) Field of Classification Search
CPC .......... G01D 4/00; G01D 4/002; G01D 4/004; G01D 4/006; G01D 4/008; G01D 4/02;
(Continued)

(56) References Cited

U.S. PATENT DOCUMENTS 5,010,568 A * 4/1991 Merriam ............... G01D 4/004
379/106.07
5,420,569 A 5/1995 Dames
(Continued)

FOREIGN PATENT DOCUMENTS

CN           1063951        8/1992
CN          101871801      10/2010
(Continued)

OTHER PUBLICATIONS

"International Application No. PCT/CN2013/082261, International Preliminary Report on Patentability dated Feb. 24, 2015", (w/ English Translation), 20 pgs.
(Continued)

*Primary Examiner* — David M. Schindler
(74) *Attorney, Agent, or Firm* — Schwegman Lundberg & Woessner, P.A.

(57) ABSTRACT

The present invention discloses a direct read metering device, comprising a digital counting wheel connected with a rotary shaft, a micro-controller—a ring magnet coaxially installed on the digital counting wheel, and a tunneling magnetoresistive angular displacement sensor installed radially displaced from the central axis of the annular magnet; the tunneling magneto-resistive angular displacement sensor (Continued)

and the ring magnet are separated by a certain distance in the direction parallel to the central axis of the ring magnet; the micro-controller is connected to the tunneling magnetoresistive angular displacement sensor and used to convert the output of the tunneling magnetoresistive angular displacement sensor into a readable number. The device uses the tunneling magneto-resistive angular displacement sensor to sense the angle of a rotary magnetic field generated by the rotation of the ring magnet which is installed on the digital counting wheel in order to permit the code of the digital counting wheel to be determined when the meter is read, thus realizing a direct read metering function. This direct read metering function is applied to provide a direct read water meter.

15 Claims, 3 Drawing Sheets

(51) Int. Cl.
  *G01B 7/30* (2006.01)
  *G01F 15/06* (2006.01)
  *G01D 4/00* (2006.01)
(52) U.S. Cl.
  CPC .............. *G01F 1/075* (2013.01); *G01F 15/06* (2013.01); *Y02B 90/241* (2013.01); *Y02B 90/247* (2013.01); *Y04S 20/32* (2013.01); *Y04S 20/50* (2013.01)
(58) Field of Classification Search
  CPC .. G01D 4/04; G01D 4/10; G01D 4/12; G01D 4/14; G01D 4/16; G01D 4/18; G01D 5/14; G01D 5/142; G01D 5/145; G01R 33/06; G01R 33/07; G01R 33/072; G01R 33/09; G01R 33/091; G01B 7/14; G01B 7/30; G01F 1/075; G01F 1/115; G01F 1/24; G01F 1/56; G01F 1/58; G01F 1/582; G01F 1/586; G01F 1/588; G01F 1/78
  See application file for complete search history.

(56) References Cited

U.S. PATENT DOCUMENTS

| | | | | |
|---|---|---|---|---|
| 5,691,484 | A * | 11/1997 | Feller | G01F 1/584 |
| | | | | 73/861.13 |
| 2003/0137381 | A1 | 7/2003 | Toyoda et al. | |
| 2006/0226825 | A1* | 10/2006 | Gebler | G01D 4/002 |
| | | | | 324/115 |
| 2007/0114990 | A1* | 5/2007 | Godkin | G01D 5/145 |
| | | | | 324/207.24 |
| 2010/0321008 | A1* | 12/2010 | Mita | G01D 5/145 |
| | | | | 324/207.25 |
| 2011/0248708 | A1* | 10/2011 | Thomas | G01D 5/145 |
| | | | | 324/207.25 |
| 2011/0290036 | A1* | 12/2011 | Pflum | G01F 15/063 |
| | | | | 73/861.08 |
| 2013/0015845 | A1* | 1/2013 | Fox | G01D 5/145 |
| | | | | 324/207.21 |
| 2013/0335073 | A1 | 12/2013 | Deak et al. | |

FOREIGN PATENT DOCUMENTS

| | | |
|---|---|---|
| CN | 201748928 | 2/2011 |
| CN | 102297652 | 12/2011 |
| CN | 102607661 | 7/2012 |
| CN | 202974369 | 6/2013 |
| CN | 203116756 | 8/2013 |
| JP | S5588181 | 7/1980 |
| WO | WO-2014/029369 | 2/2014 |

OTHER PUBLICATIONS

"International Application No. PCT/CN2013/082261, Written Opinion dated Dec. 5, 2013", (w/ English Translation), 18 pgs.
Lv, Hua, et al., "Performance and applications of magnetic sensors based on TMR effect", (w/ English Abstract), *Journal of Magnetic Materials and Devices*, vol. 43, No. 3, (Jun. 2012), 1-4, 15.
"International Application No. PCT/CN2013/082261, International Search Report dated Dec. 5, 2013", (dated Dec. 5, 2013), 12 pgs.

\* cited by examiner

US 9,880,023 B2

DIRECT READ METERING DEVICE AND DIRECT READ WATER METER

PRIORITY CLAIM TO RELATED APPLICATIONS

This application is a U.S. national stage application filed under 35 U.S.C. §371 from International Application Serial No. PCT/CN2013/082261, which was filed Aug. 26, 2013, and published as WO 2014/029369 on Feb. 27, 2014, and which claims priority to China Application No. 201220424579.0, filed Aug. 24, 2012, which applications and publication are incorporated by reference as if reproduced herein and made a part hereof in their entirety, and the benefit of priority of each of which is claimed herein.

TECHNICAL FIELD

This invention relates to a direct read metering device and in particular a direct read water meter, in particular, it refers to the use of tunneling magnetoresistive angular displacement sensors used as sensing components in an electronic direct read water meter.

BACKGROUND

With the rapid development of sensor technology, traditional mechanical meters are gradually transitioning to a new form of electronically read meters. There are two main categories of electronically read meters. The first category is incremental encoders or pulse counters, wherein an electronic switch is used as a sensor component, whereby a pulse from the switch represents a fixed unit of measurement data, and the total number of pulses read provides a cumulative measurement of the metered quantity. The other type is an absolute encoder herein referred to as an electronic direct read metering device. To implement such an encoder optical encoder technology is often used with a special coding technique in order to directly read the measurement quantity with no need for pulse counting. As a result, the direct read metering approach has several key advantages compared with pulse counting meters including the capability to measure without applied power. Present direct read meters utilizing optical encoder technology show a cumulative error phenomenon resulting from bubbles, stray light, dirt, leakage and other factors.

SUMMARY OF THE INVENTION

The object of the present invention is to provide a novel, advanced, and reliable electronic direct read water meter. The invention uses magnetic absolute encoder technology, the advantage of this approach compared with optical encoders is high resolution, elimination of cumulative error problems, and good stability, thereby completely eliminating the flaws of optical encoder technology. The present invention utilizes tunneling magnetoresistive angular displacement sensors with a ring magnet mounted on a rotating digital counting wheel in order to produce a rotating magnetic field wherein the angle of the magnetic field is used to provide the metric representing the digital measurement readings, thereby enabling the direct read measurement function.

One aspect of the present invention provides a direct read metering device which comprises a digital counting wheel connected to a rotating shaft, and including a microcontroller. The direct read metering device further comprises a ring magnet installed coaxially on the counting wheel, and the tunneling magnetoresistance angular displacement sensor is displaced from the central axis of the ring magnet, and said the tunneling magnetoresistive angular displacement sensor is additionally displaced from the ring magnet in the direction parallel to the central axis of the ring magnet.

the output of said tunneling magnetoresistive angular displacement is connected to a microcontroller in order to convert the output of the tunneling magnetoresistive angular displacement sensor to a digital readout form.

Preferably, the tunneling magnetoresistive angular displacement sensor comprises two orthogonal single-axis Wheatstone bridges oriented at 90 degrees with respect to each other to form a biaxial angular displacement sensor.

Preferably, the magnetization direction of the ring magnet is radially or axially aligned.

Preferably, the distance from the ring magnet to the tunneling magnetoresistive angular displacement sensor is 1-3 mm, and the tunneling magnetoresistive angular displacement sensor is radially displaced 3-5 mm from the central axis of the ring magnet.

Another implementation of the present invention provides a direct read metering device including multiple counting units and a microcontroller. Each of the said counting units comprises:

a rotating shaft connected to the digital counting wheel;

a ring magnet coaxially mounted within the digital counting wheel;

a tunneling magnetoresistive angular displacement sensor offset relative to the axis of the ring magnet offset, such that the tunneling magnetoresistive angular displacement sensor and the ring magnet are displaced in a direction parallel to the central axis of the ring magnet, adjacent digital counting wheels rotate at a relative ratio of 1:10 turns, the output of each said tunneling magnetoresistive angular displacement is connected to a microcontroller in order to convert the output of the tunneling magnetoresistive angular displacement sensor to a digital readout form.

Preferably, the direct read metering device further comprises an interface connected to said microcontroller.

Preferably, each of the tunneling magnetoresistive angular displacement sensors comprises two orthogonal single-axis Wheatstone bridges oriented at 90 degrees with respect to each other to form a biaxial angular displacement sensor.

Preferably, each ring magnet has an outer diameter of 15~20 mm, an inner diameter of 2~8 mm, and the thickness of 1~4 mm, and the distance between adjacent ring magnets is 6-10 mm in a direction along the common central axis of the ring magnets.

Preferably, in each counting unit, the distance between the ring magnet and the tunneling magnetoresistive angular displacement sensors is between 1-3 mm, and the tunneling magnetoresistive angular displacement sensor is located at a distance of 3-5 mm from the central axis of the ring magnet.

Preferably, the direct reading of the metering means comprises 1 to 10 counting units.

In another preferred implementation of the present invention, the direct read metering device described above, is included in a direct read water meter.

The metering device descried in the present invention has a first advantage that it does not require electricity to record the position of the rotating wheel. This is different from existing incremental encoder devices, which require continuous power in order to count the cumulative number of pulses. The present invention with its tunneling magnetoresistive angular displacement sensors can provide an absolute measure of the wheel angle without the need to rely on a continuous power supply making it easy to implement. Secondly, because it uses a digital absolute encoder based on the digital counting wheels instead of an incremental encoder, cumulative error from missing or extra pulses is eliminated; third, the integration of multiple counting units to form a water meter is very simple; fourth, it has high reliability; and fifth, it is suitable for low cost remote meter reading.

FIGURES

FIG. 1 a schematic view of the structure of the present invention.

FIG. 2A is schematic diagram of a ring magnet used for the invention with magnetization direction aligned parallel to the rotation axis.

FIG. 2B schematic diagram of a ring magnet used for the invention that has its magnetization direction aligned along the diameter of the magnet.

DESCRIPTION OF THE PREFERRED EMBODIMENTS

Figure 1:
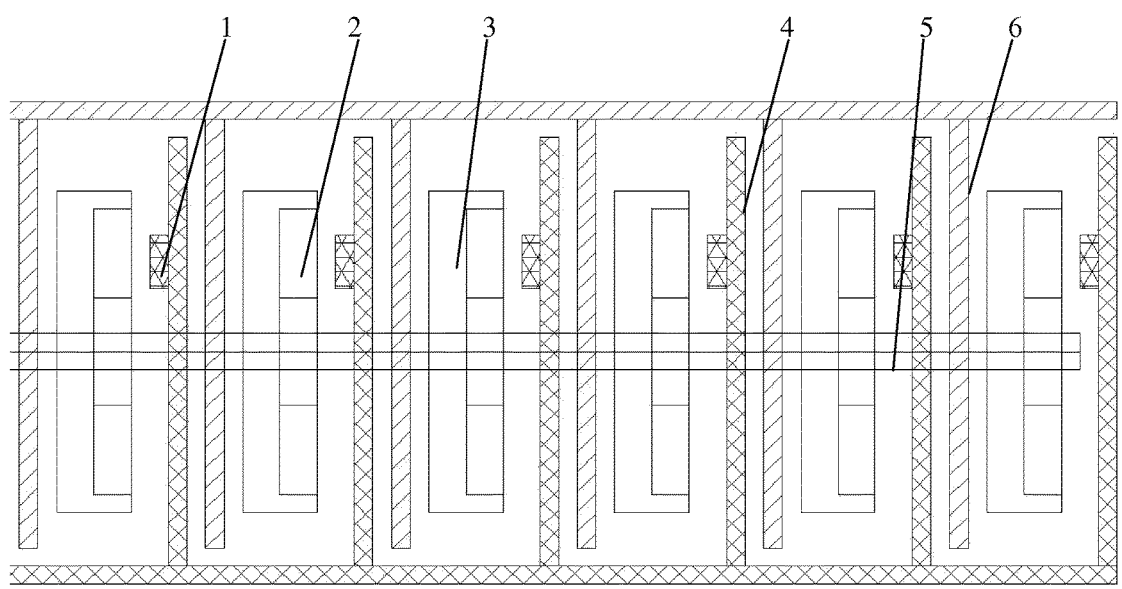

FIG. 1 shows a schematic block diagram of the present invention. FIG. 1 schematically shows a metering device implemented using magnetic sensor technology. The metering means comprises a digital counting wheel 3 mounted concentrically with a ring magnet 2, the ring magnet has two poles and it is magnetized along a diagonal. Adjacent to the digital counting is a circuit board on which tunneling magnetoresistive angular displacement sensor 1 is mounted. The center of the tunneling magnetoresistive angular displacement sensor 1 is displaced from the center of the digital counting wheel and the ring magnet 2. The center of the rotating shaft passes through the center of the digital counting wheel. The digital counting wheel is fixed to the frame, the tunneling angular displacement sensor outputs are connected through the circuit board to a microcontroller, and the output of the microcontroller is connected to the meter interface.

Figure 2A:
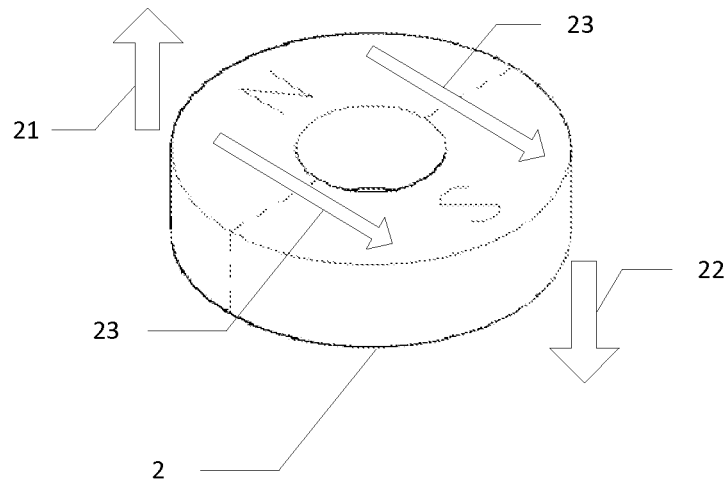

A typical ring magnet 2 shown in FIG. 2A. In this figure, the broken line on the surface plane of the ring magnet shows it is divided into two poles, the magnetization direction in FIG. 2A being perpendicular to the plane. On one side the magnetization points upwards 21, and on the other side the magnetization points downwards 22. Magnetic field lines 23 are parallel to the face of the magnet, running from the upwardly pointing magnetic pole 21 to the downwardly pointing magnetic pole 22. Because the digital counting wheel 3 rotates on an axis, the tunneling magnetoresistive angular displacement sensor 1 is exposed to a changing magnetic field from the ring magnet 2. The tunneling magnetoresistive angular displacement sensor 1 output produces a cosine waveform representing the angle of the ring magnet 2 relative to the reference direction of the tunneling magnetoresistive angular displacement sensor 1.

Figure 2B:
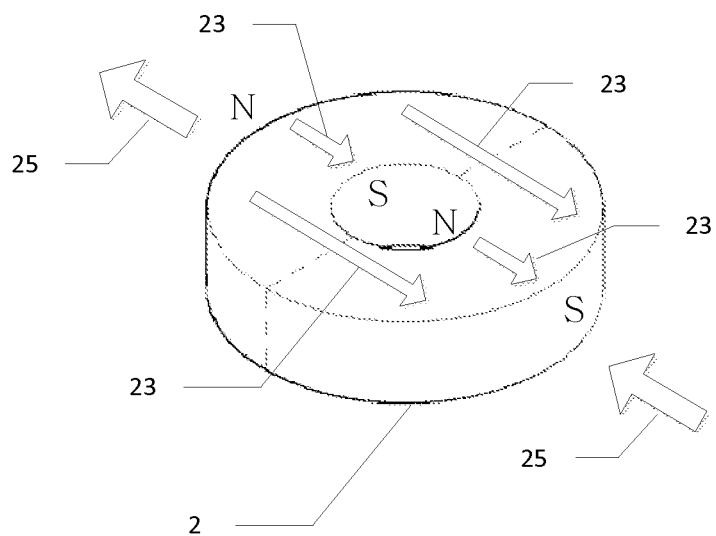

FIG. 2B shows an alternative way to magnetize the ring magnet, that is, the magnetization direction 25 is aligned parallel to the diameter. In this case, the direction of magnetic field lines 23 is opposite to the magnetization direction at the poles.

Tunneling magnetoresistance is produced by spin polarized tunneling of electrons between two conductive ferromagnetic layers. The two ferromagnetic layers are separated by an insulating or semiconducting tunnel barrier, this three layered structure is called a magnetic tunnel junction. One of the ferromagnetic layers is called the free ferromagnetic layer and its magnetization is aligned in a direction parallel to the direction of the applied magnetic field. The magnetization direction of the other ferromagnetic layer is fixed, and it does not align parallel to the applied magnetic field. This layer is called the pinned layer. When a bias voltage is applied across the tunnel barrier layer, and the two ferromagnetic layers magnetizations rotates into different directions, the tunneling magnetoresistive angular displacement sensor's resistance varies sinusoidally. At the extremes, when the magnetization direction of the free layer and the pinned layer are oppositely oriented, the tunneling magnetoresistive angular displacement sensor shows maximum resistance, when the magnetization direction of the free layer and the pinned layer are the same, the tunneling magnetoresistive angular displacement sensor shows minimum resistance.

Figure 3:
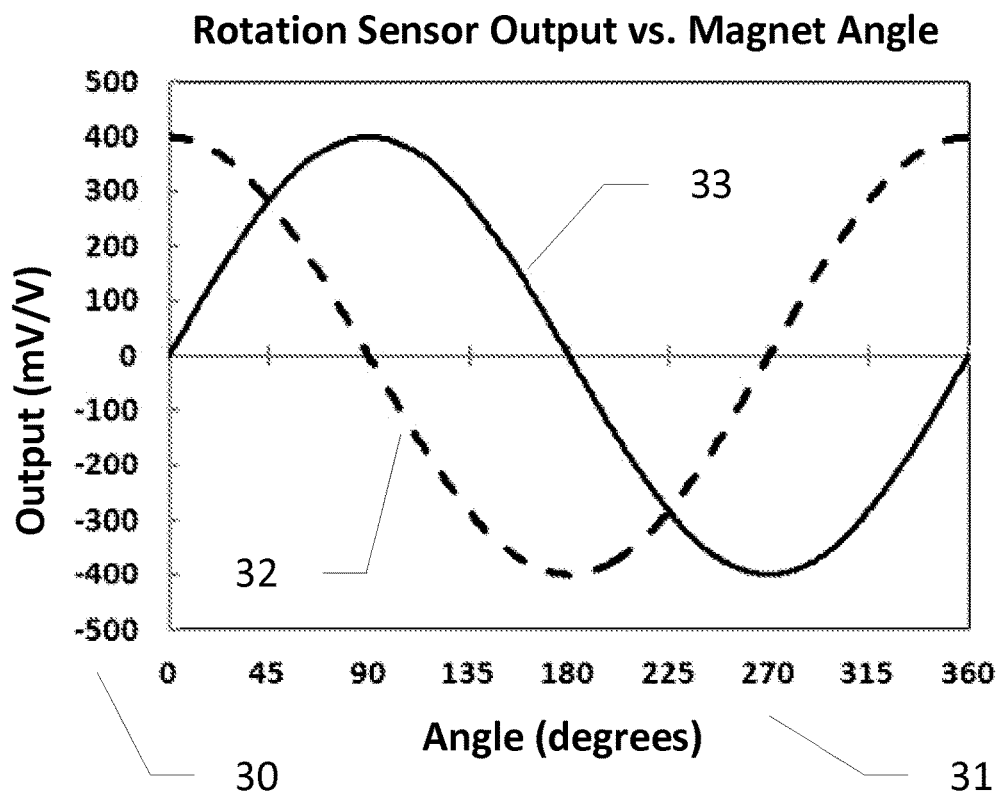
FIG. 3 is plot of the typical output of the tunneling magnetoresistive angular displacement sensor.

Each of the tunneling magnetoresistive angular displacement sensor used in this invention needs to consist of two magnetic tunnel junction bridge sensors. The magnetization directions of the pinned layers of these two magnetic tunnel junction bridge sensors must be oriented perpendicular to each other, so that each can generate an output with a phase difference of 90 degrees with respect to the other, such that the cosine output generated by the bridge sensors can be used to calculate the magnetic field angle. The output of these two sensor bridges may be provided by two single-axis rotation sensor orthogonal to each other, or by a single biaxial rotation sensor. These models are representative of the rotation sensor produced by Jiangsu MultiDimension Technology Co., Ltd., which produces representative models such as the MMA153F and MMA253F among others. The output waveform of a rotation sensor is shown in FIG. 3, where the horizontal axis 31 in the figure is represents the angle of the magnetic field generated by the ring magnet relative to the reference axis of the rotation sensor, and waveform 32 represents the cosine output voltage waveform while waveform 33 is the sine output waveform.

Figure 4:
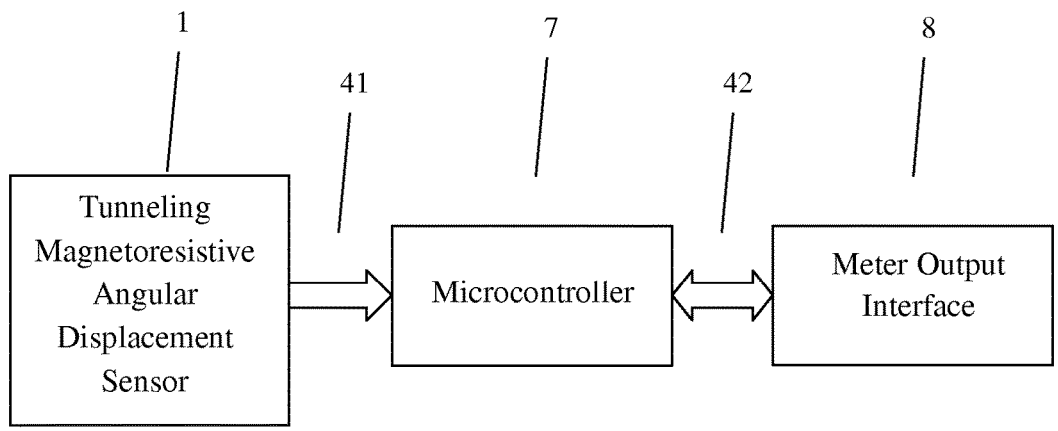
FIG. 4 is a circuit block diagram of the invention.

The digital processing circuit concept is shown in FIG. 4. Here, a highly integrated semiconductor device called a microcontroller 7, is connected to the output of the tunneling magnetoresistive angular displacement sensor 41 the sensor output is representative of the rotation angle of the digital counting wheels 3, and therefore it can be used to determine the digital value represented by the wheel. The microcontroller thus provides an absolute encoder function.

Because two mutually orthogonal tunneling magnetoresistive angular displacement sensor bridges are used for each digital counting wheel, and the output values of the two angular displacement sensors has a cosine relationship on ring magnet field angle $\alpha$, described by the following relationships:

$$OUT1 = COS(\alpha)$$

$$OUT2 = SIN(\alpha)$$

the arctangent function may be used to calculate the rotation angle of rotation using OUT1 and OUT2:

$$\alpha = ATAN(OUT2/OUT1).$$

The $\alpha$ value represents the entire angular range from 0 to 360 degrees. In order to map the angle into numbers 0-9, the circumference of the wheel must be broken into 10 angle intervals, thus the range of a is divided into 10 intervals, each corresponding to a specific digit.

Furthermore, as shown in FIG. 1, a tunneling magnetoresistive angular displacement sensor is disposed within the housing 1 of a direct read metering device along with a ring magnet 2, digital counting wheel 3, a circuit board 4, a rotary shaft 5 and a frame 6, wherein the tunneling magnetoresistive angular displacement sensor 1 is connected to a circuit board 4, the ring magnet 2 is connected to the digital counting wheel 3, each of which is placed concentrically around axial rotation shaft 5 of the digital counting wheel 3.

Within the meter housing, a ring magnet 2 and digital counting wheel 3 together with an adjacent tunneling magnetoresistive angular displacement sensor 1 are combined, and the tunneling magnetoresistive angular displacement sensor of this set is connected to circuit board 4, and these items combined form a counting unit. Preferably, the direct read metering device may contain from 1 to 10 of such counting units. Adjacent counting units are connected by a gearing mechanism that causes the counting wheels to rotate in a 1:10 relationship, i.e., if the left-most counting wheel is the first then the adjacent wheel to the right rotates 1 time for each $10^1$ rotations of the first wheel, the next wheel to the right will count $10^2$ rotations, and so on, if there are 10 counting wheels, the right most wheel will represent units of $10^{10}$ rotations of the left-most wheel.

FIG. 2 shows the ring magnet 2. The ring magnet preferably has the following characteristics: an outer diameter of 15~20 mm, an inner diameter of 2~8 mm, and the thickness of 1~4 mm.

For a water meter, each element is preferably spaced relative to each other within the housing in the following manner: the pitch of the adjacent ring magnets is 6~10 mm. The tunneling magnetoresistive angular displacement sensors 1 are separated from the ring magnets by a gap of 1~3 mm. The tunneling magnetoresistive angular displacement sensors are moreover located off axis from the rotation shaft by a distance of the 3~5 mm. The diameter of the rotation shaft is from 2~7 mm.

As shown in FIG. 4, the tunneling magnetoresistive angular displacement sensor output is connected with the input of a micro-controller 7, and the microcontroller 7 output is connected to the external interface of the meter 8. The tunneling magnetoresistive angular displacement sensor 1, the microcontroller 7 and meter interface 8, may be commercially available components. The circuit board may contain a single biaxial tunneling magnetoresistive angular displacement sensor 1, or it may contain two single-axis tunneling magnetoresistive angular displacement sensors 1, the two single-axis sensors rotated by 90 degrees with respect to the wheel 3 in order to span the full angular range.

The present invention is not limited to the above preferred embodiments. Technical personnel skilled in the art can implement various modifications of the invention according to the principles herein described. Therefore, any modification in accordance with the principles so described in the present invention, should be understood to fall within the scope of the present invention.

The invention claimed is:

1. A system comprising a direct read metering device, the device comprising:
    a microcontroller;
    a shaft with an axis;
    a plurality of counting units arranged along the shaft and configured to be rotated about the axis of the shaft, each of the plurality of counting units comprising:
        a digital counting wheel placed on the shaft;
        a first ring magnet installed on the digital counting wheel, the first ring magnet having a central axis aligned with the axis of the shaft, and the first ring magnet having only two poles, wherein the first ring magnet is spaced apart from an adjacent ring magnet in an adjacent counting unit of the plurality of counting units by a first length; and
        a tunneling magnetoresistive angular displacement sensor displaced from the central axis of the first ring magnet, wherein the tunneling magnetoresistive angular displacement sensor is additionally spaced at a second length smaller than the first length from the first ring magnet in a direction parallel to the central axis of the first ring magnet, and wherein the tunneling magnetoresistive angular displacement sensor includes two magnetic tunnel junction bridge sensors, each of the two magnetic tunnel junction bridge sensors including a pinned layer with a magnetization direction, and the magnetization directions being perpendicular to each other, and
    wherein the microcontroller is connected to the tunneling magnetoresistive angular displacement sensor for each of the plurality of counting units, and the microcontroller is configured to convert outputs of the tunneling magnetoresistive angular displacement sensors to a digital format.

2. The system of claim 1, wherein, for each counting unit, the two magnetic tunnel junction bridge sensors include two single-axis tunneling magnetoresistive angular displacement sensors to form a two-axis angular displacement sensor.

3. The system of claim 1, wherein, for each counting unit, the second length is in a range of 1-3 mm, and the tunneling magnetoresistive angular displacement sensor is located 3-5 mm from the central axis of the first ring magnet.

4. The system of claim 1, wherein the digital counting wheels of adjacent counting units of the plurality of counting units are configured to rotate with a turns ratio of 1:10 respectively.

5. The system of claim 4, wherein the direct read metering device further includes an interface connected to the microcontroller.

6. The system of claim 4, wherein, for each counting unit, the two magnetic tunnel junction bridge sensors include two single-axis angular displacement sensors to form a two-axis angular displacement sensor.

7. The system of claim 4, wherein each first ring magnet in the plurality of counting units has an outer diameter of 15-20 mm, an inner diameter of 2-8 mm, and a thickness of 1-4 mm.

8. The system of claim 4, wherein within each counting unit the second length is in a range of 1-3 mm, and the tunneling magnetoresistive angular displacement sensor is located 3-5 mm from the central axis of the first ring magnet.

9. The system of claim 4, wherein the plurality of counting units includes up to 10 counting units.

10. The system of claim 1, further comprising a water meter, the water meter including the direct read metering device.

11. The system of claim 4, further comprising a water meter, the water meter including the direct read metering device.

12. The system of claim 1, wherein, for each counting unit, the two magnetic tunnel junction bridge sensors include two Wheatstone bridges to form a two-axis angular displacement sensor.

13. The system of claim 4, wherein, for each counting unit, the two magnetic tunnel junction bridge sensors include two Wheatstone bridges to form a two-axis angular displacement sensor.

14. The system of claim 4, wherein, for each counting unit, the first length is in a range from 6 mm to 10 mm and the second length is in a range from 1 mm to 3 mm.

15. The system of claim 1, wherein, for each counting unit, the first length is in a range from 6 mm to 10 mm and the second length is in a range from 1 mm to 3 mm.

* * * * *

UNITED STATES PATENT AND TRADEMARK OFFICE
CERTIFICATE OF CORRECTION

PATENT NO. : 9,880,023 B2
APPLICATION NO. : 14/421941
DATED : January 30, 2018
INVENTOR(S) : Wang et al.

It is certified that error appears in the above-identified patent and that said Letters Patent is hereby corrected as shown below:

On the Title Page

In item (30), in "Foreign Application Priority Data", in Column 1, Line 1, delete "2012 2 0424579 U" and insert --201220424579.0-- therefor In item (57), in "Abstract", in Column 2, Line 3, delete "micro-controller-a" and insert --micro-controller, a-- therefor On page 2, in Column 1, under "Abstract", Line 10, delete "wheel" and insert --wheel,-- therefor Signed and Sealed this
Twenty-eighth Day of May, 2019

Andrei Iancu
*Director of the United States Patent and Trademark Office*